United States Patent
Kwon

(10) Patent No.: US 12,534,042 B2
(45) Date of Patent: Jan. 27, 2026

(54) AIRBAG APPARATUS FOR VEHICLE

(71) Applicant: HYUNDAI MOBIS CO., LTD., Seoul (KR)

(72) Inventor: Oh Koang Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/734,660

(22) Filed: Jun. 5, 2024

(65) Prior Publication Data

US 2025/0145107 A1 May 8, 2025

(30) Foreign Application Priority Data

Nov. 6, 2023 (KR) .................. 10-2023-0151401

(51) Int. Cl.
*B60R 21/276* (2006.01)
*B60R 21/261* (2011.01)

(52) U.S. Cl.
CPC .......... *B60R 21/276* (2013.01); *B60R 21/261* (2013.01)

(58) Field of Classification Search
CPC ... B60R 21/276; B60R 21/261; B60R 21/217; B60R 2021/2765
See application file for complete search history.

(56) References Cited

U.S. PATENT DOCUMENTS

| | | | | |
|---|---|---|---|---|
| 5,234,229 A * | 8/1993 | Gordon | ................ | B60R 21/276 280/736 |
| 6,588,795 B2 * | 7/2003 | Fischer | .............. | B60R 21/2035 280/736 |
| 6,736,425 B2 * | 5/2004 | Lemon | .................. | B60R 21/276 280/739 |
| 6,899,134 B2 * | 5/2005 | Breed | .................. | B60R 21/276 280/739 |
| 7,036,843 B2 * | 5/2006 | Okamoto | ................ | B60R 21/36 280/739 |
| 7,040,654 B2 * | 5/2006 | Selfa | ..................... | B60R 21/217 280/739 |
| 2005/0051217 A1 * | 3/2005 | Bastien | .................. | F16K 3/265 137/538 |

FOREIGN PATENT DOCUMENTS

KR 20080111999 A * 12/2008 ............. F16B 39/02

OTHER PUBLICATIONS

KR-20080111999-A (machine translation) (Year: 2008).*

* cited by examiner

*Primary Examiner* — Jason D Shanske
*Assistant Examiner* — Joselynn Y Sliteris
(74) *Attorney, Agent, or Firm* — NSIP Law

(57) ABSTRACT

An airbag apparatus for a vehicle is provided. The airbag apparatus includes a housing having a mounting plate accommodating an airbag cushion and an outer cover covering an opening of the mounting plate, an inflator disposed in the mounting plate and configured to inject gas into the airbag cushion, and a connector that connects the mounting plate with the inflator. The connector includes a guide member that guides movement of the inflator by being compressed or decompressed based on a time of gas discharge from the inflator.

9 Claims, 5 Drawing Sheets

AIRBAG APPARATUS FOR VEHICLE

CROSS-REFERENCE TO RELATED APPLICATION

This application claims priority to and the benefit under 35 USC § 119 of Korean Patent Application No. 10-2023-0151401, filed on Nov. 6, 2023, in the Korean Intellectual Property Office, the entire disclosure of which is hereby incorporated by reference in its entirety for all purposes.

BACKGROUND

1. Field

The present invention relates to an airbag apparatus for a vehicle.

2. Description of the Related Art

Airbag apparatuses installed in a vehicle serve to prevent a vehicle occupants' body from colliding with the interior facilities of the vehicle in the event of a vehicle collision accident. Such airbag apparatuses are hidden from view behind the interior components of the vehicle in ordinary situations where a collision accident does not occur.

Therefore, in the event of a vehicle collision accident, the airbag cushions of the airbag apparatuses project out to pass through the interior components of the vehicle and come into contact with the vehicle occupants. More specifically, an airbag apparatus may include an airbag cushion that comes into direct contact with a vehicle occupant and an inflator that injects gas into the interior of the airbag cushion to inflate the airbag cushion.

Among the above components, because the airbag cushion is stored in a folded state until gas is injected into the interior thereof, the internal space of the airbag cushion at the initial stage of deployment is small. Therefore, at the initial point of gas discharge from the inflator, the gas is directed towards the entire area of the small space in the airbag cushion.

Meanwhile, one or more vent holes are formed in the airbag cushion to prevent an excessive amount of gas from remaining inside the airbag cushion and since the airbag cushion remains folded until gas is discharged from the inflator, the vent holes remain blocked by the folded airbag cushion. Therefore, at the initial point of gas discharge from the inflator, it is difficult to discharge gas through the vent holes, and thus damage such as the tearing of the airbag cushion by the gas can occur. Thus, a reinforcing material is coupled to the airbag cushion to prevent damage to the airbag cushion, but this can increase manufacturing costs and decrease productivity.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention is directed to providing an airbag apparatus for a vehicle that is capable of controlling the amount of gas introduced into an airbag cushion at an initial point of gas discharge from an inflator.

In a general aspect of the disclosure, an airbag apparatus for a vehicle includes: a housing including: a mounting plate accommodating an airbag cushion therein; and an outer cover covering an opening of the mounting plate; an inflator disposed in the mounting plate and configured to inject gas into the airbag cushion; and a connector that connects the mounting plate with the inflator, wherein the connector includes a guide member that guides movement of the inflator by being compressed or decompressed based on a time of gas discharge from the inflator.

The connector may further include: a first coupling member that passes through the mounting plate and the inflator; and a second coupling member rotatably coupled to the first coupling member, and the guide member may be disposed between the inflator and the second coupling member.

The second coupling member of the connector may form a movement space while not in contact with the inflator.

The guide member may include a first end portion and a second end portion that are spaced apart from each other, and the first end portion and the second end portion may be compressed or decompressed between a first position at which the first end portion and the second end portion may be mutually misaligned and a second position at which at least portions of the first end portion and the second end portion overlap.

The inflator may include a main block that accommodates a material for generating gas therein, the main block including an outlet, and a support plate that surrounds the main block, the support plate being disposed between the mounting plate and the guide member of the connector.

A first height of the movement space may be greater than or equal to the sum of a second height from the first end portion of the guide member of uncompressed state to the second end portion and a third height of the support plate of the inflator.

The support plate of the inflator may be disposed: at a third position at which the support plate is in contact with the mounting plate in a state in which the first end portion and the second end portion of the guide member of the connecting unit are disposed at the first position; and at a fourth position at which the support plate is spaced apart from the mounting plate in a state in which the first end portion and the second end portion of the guide member of the connecting unit are disposed at the second position.

The support plate of the inflator may form a discharge space for gas along with the mounting plate while the guide member of the connecting unit is disposed at the fourth position.

The support plate of the inflator may be pressed by the guide member of the connecting unit that is decompressed to close the discharge space.

In another general aspect of the disclosure, an airbag apparatus for a vehicle includes: an airbag housing for accommodating an airbag cushion therein, the airbag housing including a mounting plate; a main housing for accommodating the airbag housing, the main housing including an outer cover covering an opening of the mounting plate; an inflator disposed at the mounting plate, the inflator comprising a support plate facing the mounting plate, and a main block including an outlet; and a connector for connecting the mounting plate with the inflator, the connector including a guide member, wherein, before the inflator is activated, the support plate and the mounting plate are in contact with each other, and wherein, after the inflator is activated, the inflator generates gas that is injected through the outlet of the main block to push the support plate and compress the guide member to form a gap between the support plate and the mounting plate to allow some of the gas to escape through the gap, and inflate the airbag.

When the generation of the gas is reduced, the gap between the support plate and the mounting plate may close.

In yet another general aspect of the disclosure, an airbag apparatus for a vehicle includes: an airbag housing for accommodating an airbag cushion therein; an inflator; and a pressure control device in communication with the airbag housing, wherein, when the inflator is activated, the inflator generates gas that is directed into the airbag housing to inflate the airbag cushion, and the pressure control device prevents pressure from exceeding a predetermined level by venting gas out of the airbag housing.

The airbag apparatus may further include a main housing for accommodating the airbag housing, wherein the main housing is secured to the vehicle.

The gas vented from the airbag housing by the pressure control device may be vented through the main housing.

The pressure control device may include a pressure relief valve.

The inflator may be activated by an electronic control unit (ECU) of the vehicle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
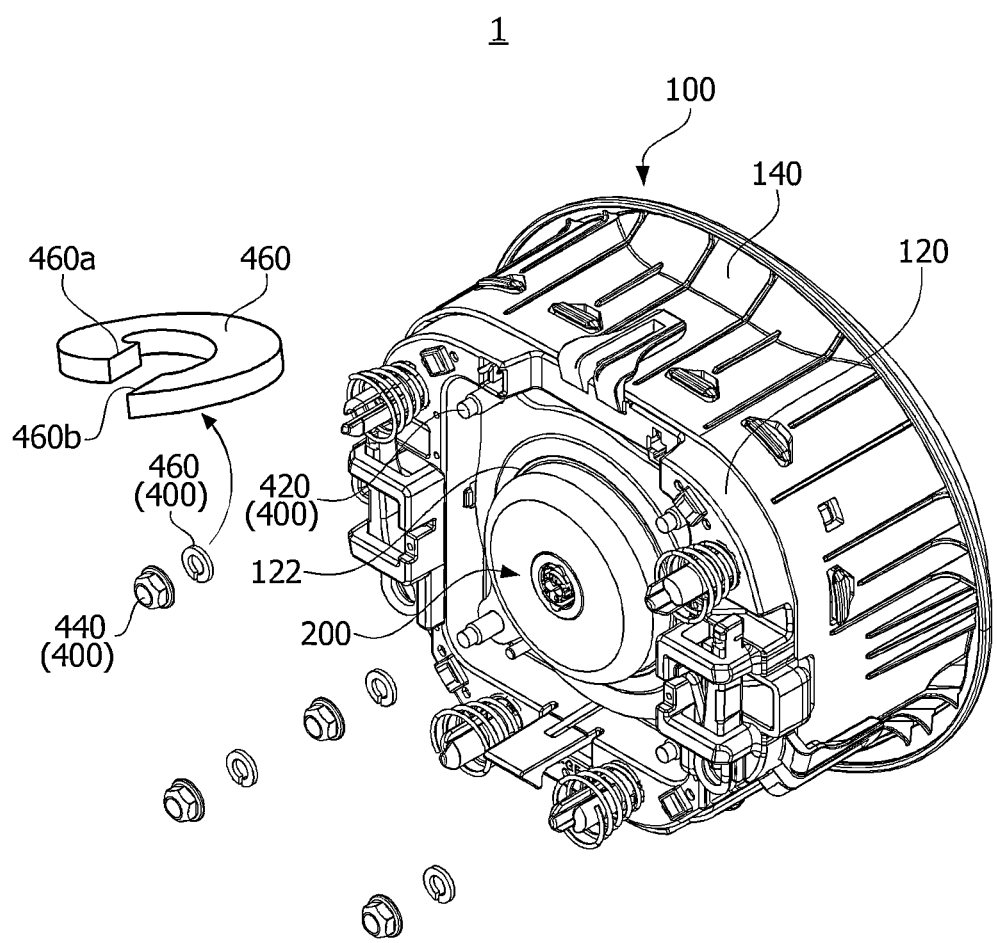
FIG. 1 is a view illustrating an airbag apparatus for a vehicle according to an embodiment of the present invention.

While the present invention is susceptible to various modifications and alternative forms, specific embodiments thereof will be shown by way of example in the accompanying drawings and described in detail. However, this is not intended to limit the present invention to specific embodiments, and it should be understood that the present invention encompasses all modifications, equivalents, and alternatives falling within the spirit and scope of the present invention.

Although the terms "first," "second," etc. may be used herein to describe various elements, these elements are not limited by the terms. The terms are only used to distinguish one element from another. For example, a first element could be called a second element, and similarly, a second element could be called a first element, without departing from the scope of the present invention. As used herein, the term "and/or" includes any and all combinations of one or more of the associated listed items.

When a first element is referred to as being "connected" or "coupled" to a second element, it should be understood that the first element can be directly connected or coupled to the second element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

In describing embodiments, when one component is described as being formed 'on or under' another component, 'on or under' includes both cases where the two components are directly in contact with each other and cases where one or more other components are positioned between the two components (indirect contact). Furthermore, when expressed as 'on or under,' it may include not only the upward direction but also the downward direction based on one component.

The terms used herein are only for the purpose of describing particular embodiments and are not intended to limit the invention. As used herein, the singular forms "a," "an," and "the" are intended to include the plural forms as well, unless the context clearly indicates otherwise. It should be further understood that the terms "comprise," "comprising," "include," and/or "including" used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the present invention will be described in detail with reference to the accompanying drawings, but the same or similar elements are designated with the same numeral references regardless of the numerals in the drawings, and redundant description thereof will be omitted.

Figure 2:
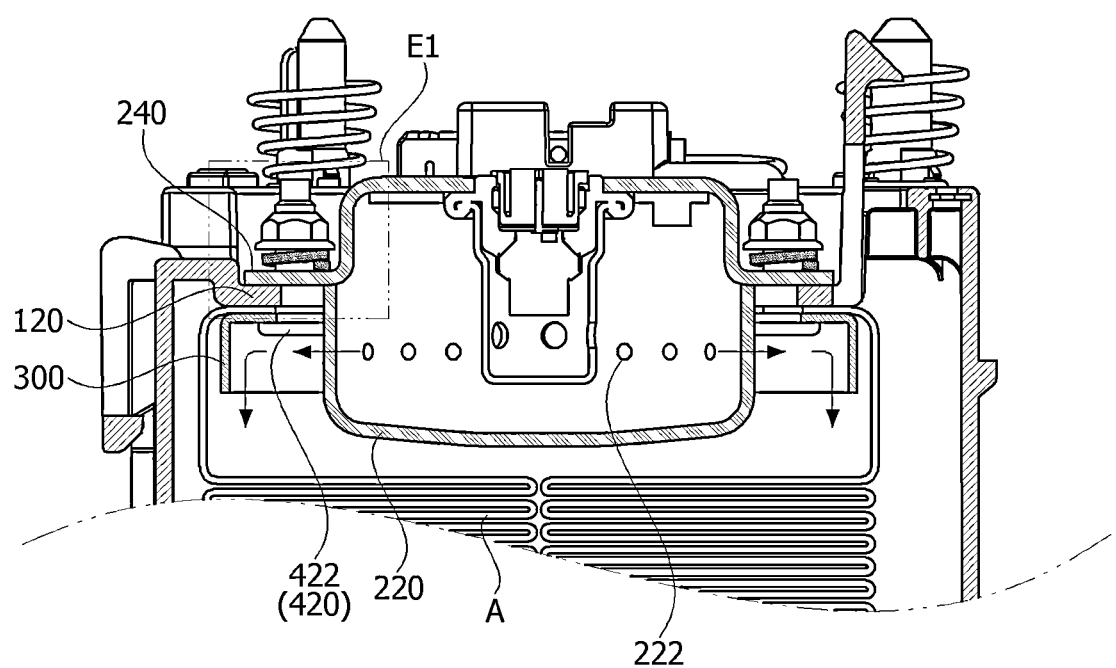
FIG. 2 is a view illustrating a state in which a guide member is disposed at a first position and a support plate is disposed at a third position.
Figure 3:
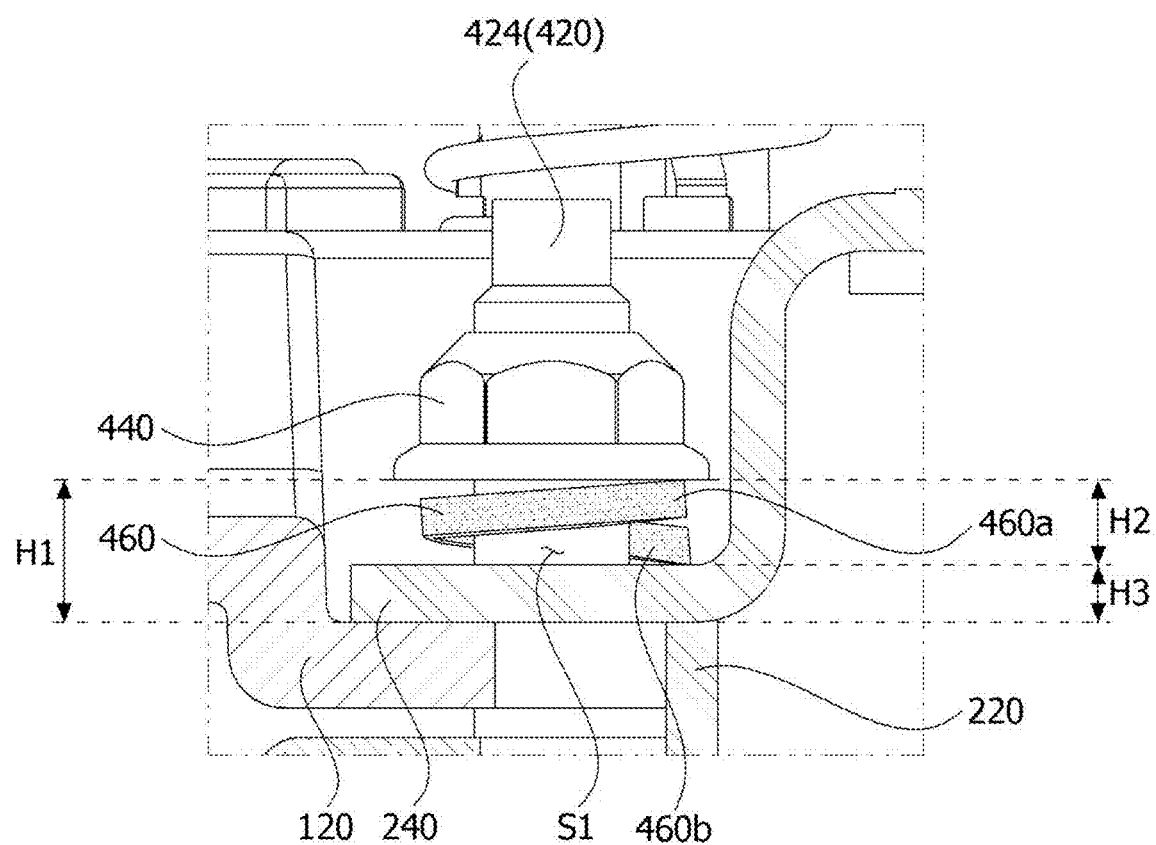
FIG. 3 is an enlarged view of portion E1 of FIG. 2.
Figure 4:
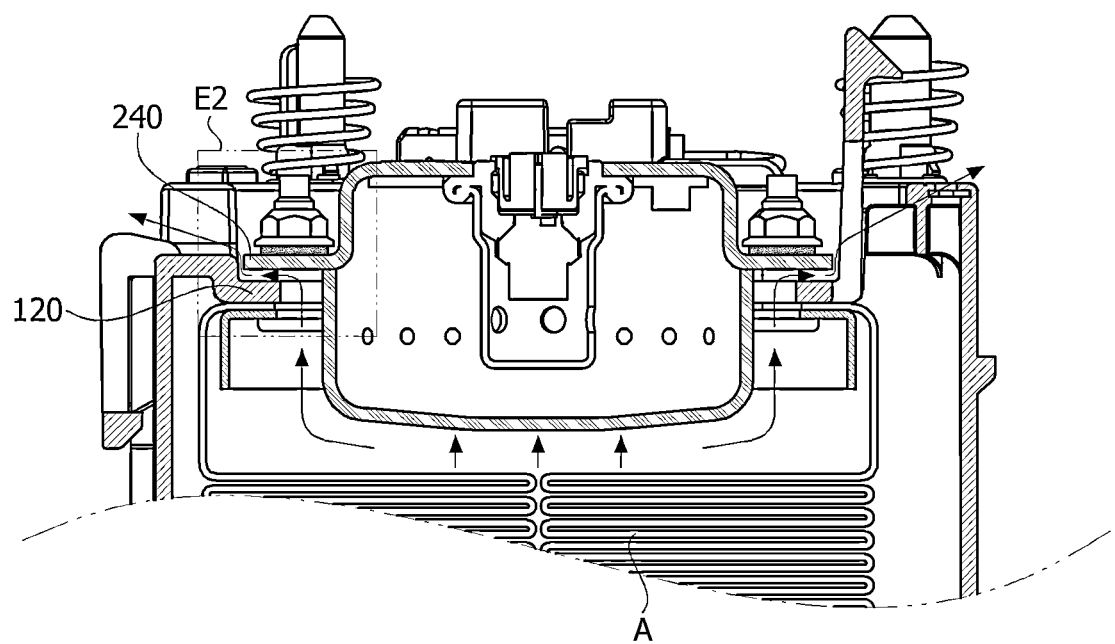
FIG. 4 is a view illustrating a state in which the guide member is disposed at a second position and the support plate is disposed at a fourth position.
Figure 5:
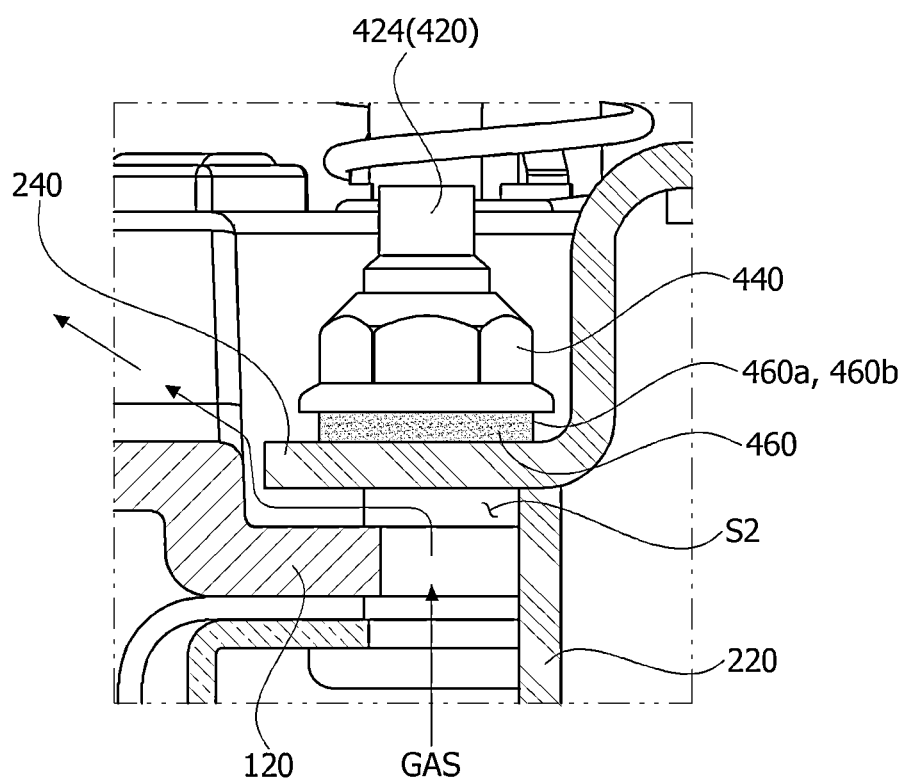
FIG. 5 is an enlarged view of portion E2 of FIG. 4.

FIG. 1 is a view illustrating an airbag apparatus for a vehicle according to an embodiment of the present invention, FIG. 2 is a view illustrating a state in which a guide member is disposed at a first position and a support plate is disposed at a third position, FIG. 3 is an enlarged view of portion E1 of FIG. 2, FIG. 4 is a view illustrating a state in which the guide member is disposed at a second position and the support plate is disposed at a fourth position, and FIG. 5 is an enlarged view of portion E2 of FIG. 4.

Referring to FIGS. 1 to 5, an airbag apparatus 1 for a vehicle according to the embodiment of the present invention may include a housing 100, an inflator 200, a retainer 300, and a connecting unit 400 (e.g., a connector). In the embodiment of the present invention, the airbag apparatus 1 for a vehicle mounted in a steering wheel installed in a driver's seat area will be described.

The housing 100 may hide an airbag cushion A in a non-deployed state. The housing 100 may include a mounting plate 120 and an outer cover 140.

The mounting plate 120 may be disposed in a mounting hole formed in the steering wheel (not shown). The mounting plate 120 may have a hollow shape. The mounting plate 120 may accommodate the folded airbag cushion A therein (i.e., the mounting plate 120 may be part of an airbag housing that accommodate the folded airbag cushion A). Also, the mounting plate 120 may include an opening to have one open side thereof so that the airbag cushion A may be deployed to the outside of the mounting plate 120. The mounting plate 120 may include a placement hole 122.

The placement hole 122 may be formed in an area of the mounting plate 120 where the inflator 200 is disposed. The placement hole 122 may have a circular shape, but is not limited thereto. The placement hole 122 may have a larger size than a main block 220 of the inflator 200 to be described below.

Also, a plurality of coupling holes may be formed in the mounting plate 120 along a circumference of the placement hole 122 to allow first coupling members 420 to pass therethrough.

The outer cover 140 may be coupled to the mounting plate 120. The outer cover 140 may cover the one open side of the mounting plate 120 while coupled to the mounting plate 120. Further, the outer cover 140 may cover the airbag cushion A accommodated in the mounting plate 120.

The inflator 200 is disposed in the mounting plate 120 and may inject gas into the airbag cushion A. The inflator 200 may include the main block 220 and a support plate 240.

The main block 220 may have a hollow shape. Therefore, the main block 220 may accommodate a material that generates gas (e.g., when the inflator 200 is activated by an electronic control unit (ECU) of the vehicle upon determination that an accident may have occurred). The main block 220 may pass through the placement hole 122 formed in the mounting plate 120 of the housing 100. The main block 220 may be disposed to pass through the placement hole 122 and span the inner space of the mounting plate 120 and the external space of the mounting plate 120. The main block 220 may include an outlet 222.

The outlet 222 may be formed in an outer surface of the main block 220. A plurality of outlets 222 may be disposed in the main block 220. The outlet 222 may be disposed in the mounting plate 120 of the housing 100. The outlet 222 may guide the flow of gas so that gas generated in the main block 220 is discharged to the outside of the main block 220.

The support plate 240 may be coupled to the main block 220. The support plate 240 may surround the main block 220. The support plate 240 may be disposed at a position that faces a periphery of the placement hole 122 of the mounting plate 120 when the main block 220 is disposed in the placement hole 122 of the mounting plate 120. The support plate 240 may be disposed between the mounting plate 120 of the housing 100 and a guide member 460 of the connecting unit 400, which will be described below. Therefore, the support plate 240 may open or close a discharge path for gas discharged from the inflator 200.

The retainer 300 may be disposed in the mounting plate 120 of the housing 100. The retainer 300 may be fixed by a first coupling member 420 of the connecting unit 400, which will be described below. The retainer 300 may protect the airbag cushion A from melting due to a high-temperature residue generated by the gas discharged from the inflator 200 by coming into direct contact with the high-temperature residue.

The connecting unit 400 may connect the mounting plate 120 with the inflator 200. The connecting unit 400 may include the first coupling member 420, a second coupling member 440, and the guide member 460.

The first coupling member 420 may include a head 422 and a body 424. That is, the first coupling member 420 may be a bolt. The first coupling member 420 passes through the mounting plate 120 and the inflator 200 to connect the mounting plate 120 with the inflator 200. Also, the first coupling member 420 passes through the retainer 300 disposed in the mounting plate 120 to connect the retainer 300 with the mounting plate 120 and the inflator 200. A portion of the body 424 of the first coupling member 420 may pass through the mounting plate 120 and may be exposed to the outside of the mounting plate 120.

A portion of the body 424 of the first coupling member 420 exposed to the outside of the mounting plate 120 may have a thread to increase a coupling force with the second coupling member 440. A plurality of first coupling members 420 may be disposed.

The second coupling member 440 may be rotatably coupled to the first coupling member 420. More specifically, the second coupling member 440 has a hollow shape, and the second coupling member 440 may have a thread formed on an inner surface thereof. Therefore, the second coupling member 440 may be rotatably coupled to the body 424 of the first coupling member 420. That is, the second coupling member 440 may be a nut with a thread. A plurality of second coupling members 440 may be disposed. In this case, the number of second coupling members 440 may be the same as the number of first coupling members 420.

The guide member 460 may be a spring washer. Therefore, the guide member 460 may be hollow and have a shape with one cut side. The guide member 460 with the above described shape may include a first end portion 460a and a second end portion 460b formed on both sides of the cut side, which are spaced apart from each other. The guide member 460 may be coupled to the body 424 of the second coupling member 440. Also, the guide member 460 may be disposed between the inflator 200 and the second coupling member 440. More specifically, the guide member 460 may be disposed between the support plate 240 of the inflator 200 coupled to the first coupling member 420 and the second coupling member 440 of the connecting unit 400.

Hereinafter, a structure and a method of controlling the internal pressure of the airbag cushion A at the initial stage of deployment will be described below.

Referring again to FIGS. 1 to 5, first, the second coupling member 440 of the connecting unit 400 may provide a movement space S1 while not in contact with the inflator 200. More specifically, the second coupling member 440 is fixedly coupled to the first coupling member 420 by screw-coupling, wherein the second coupling member 440 is rotated so as not to come into contact with the support plate 240 of the inflator 200. Therefore, the movement space S1 may be formed between the support plate 240 of the inflator 200 and the second coupling member 440 of the connecting unit 400. The guide member 460 may be disposed in the movement space S1. The height of the movement space S1 may be determined according to a position at which the second coupling member 440 is coupled to the first coupling member 420.

That is, the guide member 460 may be coupled to the first coupling member 420 before the second coupling member 440. Therefore, the support plate 240 of the inflator 200 and the guide member 460 of the connecting unit 400 may be disposed between the mounting plate 120 of the housing 100 and the coupling member 440 of the connecting unit 400.

In this case, the first height H1 of the movement space S1 may be greater than or equal to the sum of the second height H2 from the first end portion 460a of the uncompressed guide member 460 to the second end portion 460b and the third height H3 of the support plate 240 of the inflator 200. When the first height H1 of the movement space S1 is less than the sum of the second height H2 from the first end portion 460a of the guide member 460 to the second end portion 460b and the third height H3 of the support plate 240 of the inflator 200, since the guide member 460 may always maintain a partial or fully compressed state to block the movement of the support plate 240 of the inflator 200 or reduce the movement space S1, a phenomenon in which the gas may be not smoothly discharged through a discharge space S2 may occur. Therefore, the first height H1 of the movement space S1 may be greater than or equal to the sum of the second height H2 from the first end portion 460a of the uncompressed guide member 460 to the second end portion 460b and the third height H3 of the support plate 240 of the inflator 200.

The airbag apparatus 1 for a vehicle with such a structure may control the internal pressure of the airbag cushion A by deforming the guide member 460 by the gas discharged from the inflator 200.

More specifically, the guide member 460 may guide the movement of the inflator 200 by being compressed or decompressed depending on the point of gas discharge from the inflator 200. For this, the first end portion 460a and the second end portion 460b are compressed or decompressed between the first position P1 where the first end portion 460a and the second end portion 460b are mutually misaligned and the second position P2 where at least some parts thereof overlap.

Further, the support plate 240 of the inflator 200 may be disposed at the third position P3 where the support plate 240 is in contact with the mounting plate 120 while the first end portion 460a and the second end portion 460b of the guide member 460 of the connecting unit 400 are disposed at the first position P1, and may be disposed at the fourth position P4 while the first end portion 460a and the second end portion 460b of the guide member 460 of the connecting unit 400 are disposed at the second position P2.

In this structure, the gas discharged from the inflator 200 through the outlet 222 is introduced into the airbag cushion A to allow the internal pressure in the airbag cushion A to push the inflator 200. More specifically, at the initial point of gas discharge when the gas is discharged through the outlet 222 of the inflator 200, the gas is introduced into the folded airbag cushion A, and since the interior of the airbag cushion A at the initial gas discharge point is small and thus the space through which gas flows is small, the space in which the gas moves in the airbag cushion A is also small when the gas is introduced into the airbag cushion A.

Therefore, the gas introduced into the airbag cushion A moves toward the inside of the airbag cushion A as well as the main block 220 of the inflator 200 located close to the folded airbag cushion A, and thus the main block 220 of the inflator 200 receives a force that pushes the main block 220 toward the outside of the mounting plate 120 of the housing 100 due to gas.

In this case, because the movement space S1 is formed between the support plate 240 of the inflator 200 and the second coupling member 440 of the connecting unit 400, the support plate 240 of the inflator 200 may move toward the second coupling member 440 of the connecting unit 400 in the movement space S1 along with the main block 220 pushed by the gas. In this process, that is, in a process in which the support plate 240 of the inflator 200 moves in the movement space S1 along with the main block 220, the support plate 240 of the inflator 200 presses the second end portion 460b of the guide member 460 of the connecting unit 400. Therefore, as the second end portion 460b of the guide member 460 is moved from the third position P3 to the fourth position P4 and faces the first end portion 460a, the guide member 460 is compressed.

In this way, in a state in which the support plate 240 of the inflator 200 moves to be spaced apart from the mounting plate 120 and the guide member 460 is compressed, that is, in a state in which the guide member 460 (the second end portion 460b) is disposed at the fourth position P4, the gas discharge space S2 may be formed along with the mounting plate 120. First, since the placement hole 122 formed in the mounting plate 120 of the housing 100 has a larger size than the main block 220 of the inflator 200, the gas discharged from the inflator 200 may primarily move through a gap formed between the placement hole 122 of the mounting plate 120 and the main block 220 of the inflator 200.

Then, the gas moving through the gap formed between the placement hole 122 of the mounting plate 120 and the main block 220 of the inflator 200 may secondarily move through the discharge space S2. The gas passing through the discharge space S2 moves to the outside of the mounting plate 120.

When the gas moves to the outside of the mounting plate 120 through the discharge space S2, the amount of gas in the airbag cushion A at the initial point of gas discharge from the inflator 200 is reduced. Thus, damage such as tearing of the airbag cushion A due to the internal pressure being excessively increased at the initial point of deploying the airbag cushion A can be prevented. Further, the vehicle occupant can be prevented from being injured when the airbag cushion A is deployed rapidly and momentarily at the initial point of deployment.

Further, in the structure, the problem of difficulty in discharging gas from the inflator 200 through a vent hole at the initial point of gas discharge because the vent hole formed in the airbag cushion A is blocked by the folded airbag cushion A at the initial point of deploying the airbag cushion A can be addressed.

When the airbag cushion A is deployed due to the gas after the initial point of gas discharge from the inflator 200, the internal pressure of the airbag cushion A decreases. This may mean that a force exerted by the gas on the main block 220 of the inflator 200 at the initial point of gas discharge from the inflator 200 becomes weaker than a force exerted by the gas on the main block 220 of the inflator 200 after the initial point of gas discharge from the inflator 200. Therefore, an elastic restoring force of the guide member 460 pressed by the support plate 240 of the inflator 200 may be greater than the force exerted by the gas on the main block 220 of the inflator 200 after the initial point of gas discharge from the inflator 200. Therefore, the second end portion 460b of the guide member 460 is decompressed by the elastic restoring force to move from the fourth position P4 to the third position P3.

The support plate 240 of the inflator 200 is pressed by the guide member 460 of the connecting unit 400, which is decompressed, thereby closing the discharge space S2. Consequently, because the movement of gas through the gap between the mounting plate 120 and the inflator 200 is blocked, the internal pressure of the airbag cushion A after the initial point of deployment can be maintained. Therefore, the vehicle occupant impact absorption of the airbag cushion A is maintained, and thus the vehicle occupant can be protected from the impact of a collision accident.

Moreover, the fact that the support plate 240 of the inflator 200 is pressed by the guide member 460 of the connecting unit 400, which is decompressed, thereby closing the discharge space S2 mean that the support plate 240 is moved by the elastic restoring force of the guide member 460. Therefore, the need for separate components and devices for closing the discharge space S2 is eliminated, and thus the manufacturing costs and time of components and devices to be used for closing the discharge space S2 can be reduced.

According to an embodiment of the present invention, since gas can be discharged through a space between the mounting plate and the inflator when gas is not smoothly discharged through a vent hole of an airbag cushion at the initial point of gas discharge from the inflator and thus the internal pressure is controlled, damage such as tearing of the airbag cushion in the initial point of deployment can be prevented.

Although embodiments of the present invention have been described above, one skilled in the art will understand that various modifications and changes can be made to the present invention without departing from the scope of the claims set forth below. Furthermore, any differences related to such modifications and changes should be interpreted as being included within the scope of the present invention as defined by the appended claims.

What is claimed is:

1. An airbag apparatus for a vehicle, the airbag apparatus comprising:
   a housing including:
      a mounting plate accommodating an airbag cushion therein; and
      an outer cover covering an opening of the mounting plate;
   an inflator disposed in the mounting plate, the inflator including a plurality of vent holes positioned below the mounting plate;
   a connector that connects the mounting plate with the inflator; and
   a first emission gap positioned between the mounting plate and an inner plate,
   wherein the connector includes a guide member configured to guide movement of the inflator by being compressed or decompressed,
   wherein the inflator includes a main block comprising the inner plate disposed on an interior of the housing and an outer plate disposed on an exterior of the housing,
   wherein, upon activation of the inflator, gas exits out of the vent holes to inflate the airbag cushion, and
   wherein, in response to pressure inside the inflated airbag cushion exceeding a predetermined level, gas forced into the first emission gap pushes the inflator to compress the guide member to form a second emission gap, while the movement of the inflator is limited such that the vent holes do not reach a level of the mounting plate, the second emission gap being formed between the mounting plate and the outer plate, and connected to the first emission gap.

2. The airbag apparatus of claim 1,
   wherein the connector further includes:
      a first coupling member that passes through the mounting plate and the inflator; and
      a second coupling member rotatably coupled to the first coupling member, and
   wherein the guide member is disposed between the inflator and the second coupling member.

3. The airbag apparatus of claim 2, wherein the second coupling member of the connector forms a movement space while not in contact with the inflator.

4. The airbag apparatus of claim 3,
   wherein the guide member includes a first end portion and a second end portion that are spaced apart from each other, and
   wherein the first end portion and the second end portion are compressed between a first position at which the first end portion and the second end portion are mutually misaligned and a second position at which at least portions of the first end portion and the second end portion overlap.

5. The airbag apparatus of claim 4, wherein the inflator includes:
   a support plate that surrounds the main block, the support plate being disposed between the mounting plate and the guide member of the connector.

6. The airbag apparatus of claim 5, wherein a first height of the movement space is greater than or equal to the sum of a second height from the first end portion of the guide member of uncompressed state to the second end portion and a third height of the support plate of the inflator.

7. The airbag apparatus of claim 5, wherein the support plate of the inflator is disposed:
   at a third position at which the support plate is in contact with the mounting plate in a state in which the first end portion and the second end portion of the guide member of the connector are disposed at the first position; and
   at a fourth position at which the support plate is spaced apart from the mounting plate in a state in which the first end portion and the second end portion of the guide member of the connector are disposed at the second position.

8. The airbag apparatus of claim 7, wherein the support plate of the inflator forms a discharge space for gas along with the mounting plate while the guide member of the connector is disposed at the second position.

9. The airbag apparatus of claim 8, wherein the support plate of the inflator is pressed by the guide member of the connector that is decompressed to close the discharge space.

* * * * *